United States Patent
Vald et al.

(10) Patent No.: US 11,275,585 B2
(45) Date of Patent: Mar. 15, 2022

(54) SYSTEM AND METHOD FOR APPROXIMATING BRANCHING OPERATIONS FOR USE WITH DATA ENCRYPTED BY FULLY HOMOMORPHIC ENCRYPTION (FHE)

(71) Applicant: Intuit Inc., Mountain View, CA (US)

(72) Inventors: Margarita Vald, Tel Aviv (IL); Yaron Sheffer, Hod Hasharon (IL); Yehezkel Shraga Resheff, Tel Aviv (IL); Tzvika Barenholz, Tel Aviv (IL)

(73) Assignee: Intuit Inc., Mountain View, CA (US)

( * ) Notice: Subject to any disclaimer, the term of this patent is extended or adjusted under 35 U.S.C. 154(b) by 173 days.

(21) Appl. No.: 16/568,988

(22) Filed: Sep. 12, 2019

(65) Prior Publication Data

US 2021/0081203 A1     Mar. 18, 2021

(51) Int. Cl.
  *G06F 9/30*     (2018.01)
  *G06F 21/60*     (2013.01)
  *G06F 21/62*     (2013.01)
  *H04L 9/00*     (2022.01)

(52) U.S. Cl.
  CPC ........ *G06F 9/30058* (2013.01); *G06F 21/602* (2013.01); *G06F 21/6227* (2013.01); *H04L 9/008* (2013.01)

(58) Field of Classification Search
  CPC ............... G06F 9/30058; G06F 21/602; G06F 21/6227; H04L 9/008
  See application file for complete search history.

(56) References Cited

U.S. PATENT DOCUMENTS

| | | | | |
|---|---|---|---|---|
| 4,912,647 A | * | 3/1990 | Wood | G06N 3/08 706/25 |
| 5,510,838 A | * | 4/1996 | Yomdin | H04N 19/54 348/384.1 |
| 2011/0016513 A1 | * | 1/2011 | Bailey, Jr. | G06F 21/577 726/5 |
| 2016/0182222 A1 | * | 6/2016 | Rane | H04L 9/008 713/168 |
| 2016/0350648 A1 | * | 12/2016 | Gilad-Bachrach | G06N 3/0481 |
| 2017/0149557 A1 | | 5/2017 | Bacon et al. | |
| 2018/0096248 A1 | * | 4/2018 | Chabanne | G06N 3/08 |
| 2019/0140818 A1 | | 5/2019 | Bent et al. | |
| 2019/0199510 A1 | * | 6/2019 | Hoshizuki | G06N 3/0481 |
| 2020/0036511 A1 | * | 1/2020 | Cheon | H04L 9/0618 |
| 2020/0084017 A1 | | 3/2020 | Bent et al. | |

FOREIGN PATENT DOCUMENTS

WO    WO 2016/118206     7/2016

OTHER PUBLICATIONS

International Search Report dated Sep. 23, 2020 issued in International Application No. PCT/US2020/040397 (4 pages).
Written Opinion dated Sep. 23, 2020 issued in International Application No. PCT/US2020/040397 (8 pages).

* cited by examiner

*Primary Examiner* — Meng Li
(74) *Attorney, Agent, or Firm* — DLA Piper LLP (US)

(57) ABSTRACT

Systems and methods that approximate and use branching operations on data encrypted by fully homomorphic encryption (FHE). The systems and methods may use polynomial approximation to convert "if" statements into "soft if" statements that may be applied to the FHE encrypted data in a manner that preserves the security of the systems and methods.

19 Claims, 4 Drawing Sheets

SYSTEM AND METHOD FOR APPROXIMATING BRANCHING OPERATIONS FOR USE WITH DATA ENCRYPTED BY FULLY HOMOMORPHIC ENCRYPTION (FHE)

DETAILED DESCRIPTION OF SEVERAL EMBODIMENTS

Embodiments described herein may be configured to extend the use of data encrypted by fully homomorphic encryption (FHE) ("FHE encrypted data") beyond how that data is typically used, particularly in a cloud-based environment. For example, the embodiments disclosed herein may directly apply additional computations (e.g., branch operations) on FHE encrypted data, reducing the use of unencrypted data and therefore increasing the security of the cloud-based environment. Moreover, the embodiments disclosed herein may also extend the use of FHE encrypted data to other algorithms and applications that conventionally could not be used with this type of data.

"Cloud computing" is on the rise. Cloud computing typically involves an enterprise using a third party's computing resources, such as e.g., its servers and or storage, to run an application on a set of data. One challenge to cloud computing is security—typically, the application is proprietary, the data is proprietary, or both are proprietary. Data breaches must be prevented to protect proprietary information and the algorithms used in the application.

Encryption may be used to protect the data. Under traditional mechanisms, for example, the data may be encrypted at a point of origin and then transported across a network as ciphertext. This encrypted data, however, must be decrypted at the point of destination for it to be processed. Once the data is decrypted, it is exposed to parties at the destination where the data is being processed. If the data represents private or sensitive information then additional security measures may need to be taken to ensure that the data is not released to unauthorized parties.

It is known in the art that fully homomorphic encryption (FHE) is a type of encryption that allows computations to be performed on encrypted data (e.g., ciphertext). When computations are performed on the FHE encrypted data, the output is an encrypted version of the computations' results. When these results are subsequently decrypted, the results match the results of the computations as if they had been performed on the original un-encrypted data (e.g., plaintext). Thus, FHE can be used for privacy-preserving outsourced storage of data and cloud-based computations of that data. For example, this allows the data to remain encrypted and out-sourced over a cloud-based environment for processing. This also allows the underlying computations to remain hidden from the source of the data as well.

The downside, however, is that only some operations (e.g., addition and multiplication) are feasible on FHE encrypted data, while others (e.g., "if" statements, thresholding) are not. It is known that an "if" statement is an operation that checks whether a condition is met, returns one value or performs an operation if the condition is met, and returns another value or performs another operation if the condition is not met. This is often referred to as a branching operation. Practically speaking, almost all algorithms require at least some "if" statements, meaning that the advantages of FHE cannot be fully achieved because the "if" statements require some other processing or even the decryption of data, which exposes the data or the algorithm to security risks. Accordingly, there is a need and desire to increase the security of cloud-based and other systems by allowing branching operations to be performed on FHE encrypted data.

The disclosed systems and methods overcome these deficiencies by approximating branching operations (e.g., "if" statements) using polynomial approximation. As can be appreciated, the ability to perform such operations unlocks many applications requiring secure computations that are otherwise impractical. This may include, for example, machine learning algorithms, analytics, and KE (knowledge engineering) type computations (e.g., for rule based systems), to name a few.

An example process for approximating and using branch operations on encrypted data may comprise inputting, at a first computing device and from a second computing device connected to the first computing device through a network connection, a computation to be applied to encrypted data and executed on the first computing device; determining that the computation includes a branching operation; replacing the branching operation with an approximated branching operation; and performing the computation on the encrypted data using the approximated branching operation to obtain an encrypted result of the computation.

Figure 1:
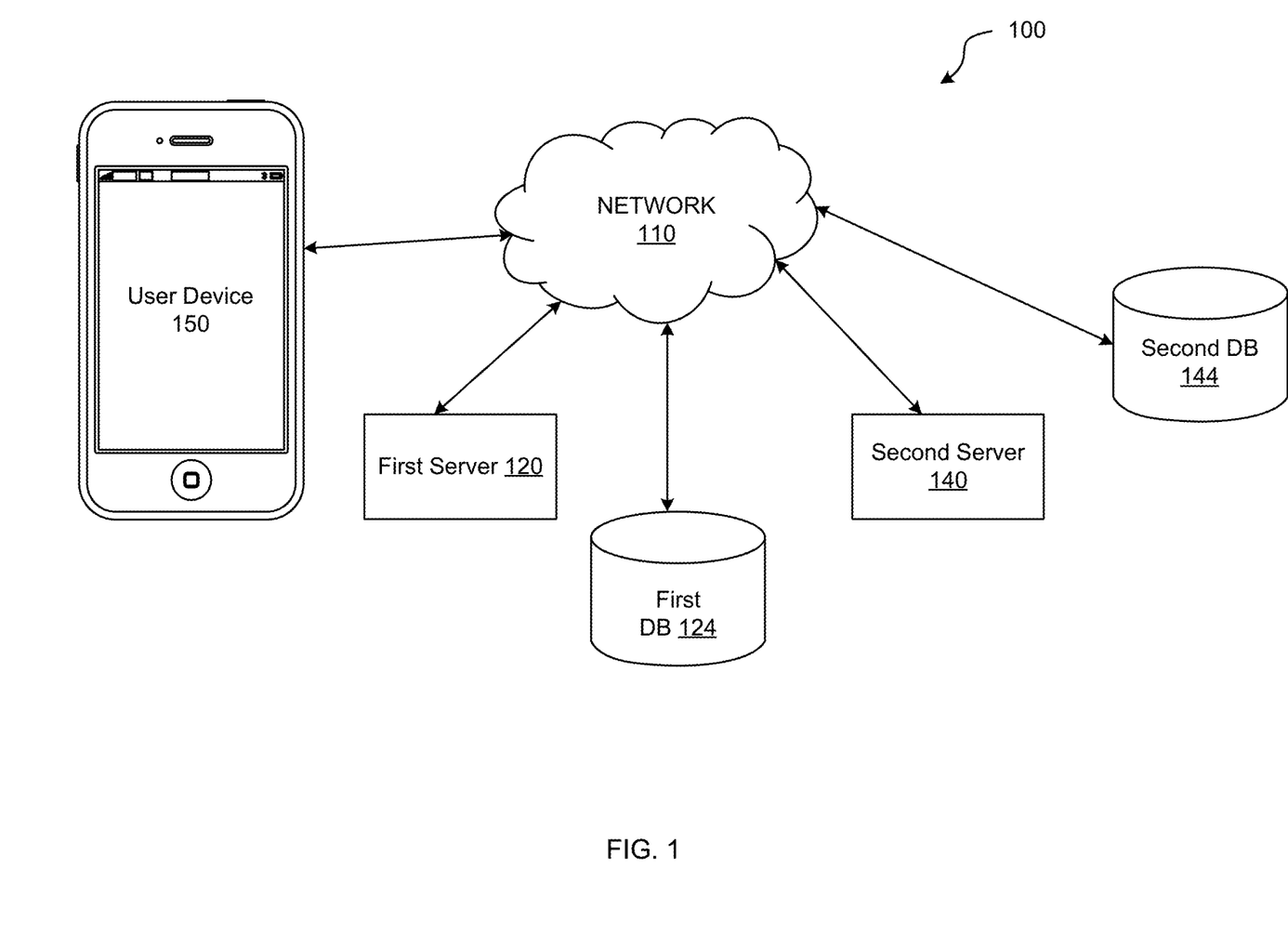
FIG. 1 shows an example of a system configured to approximate branching operations for use with FHE encrypted data in accordance with an embodiment of the present disclosure.

FIG. 1 shows an example of a system 100 configured to approximate branch operations (e.g., "if" statements) and apply them to FHE encrypted data according to an embodiment of the present disclosure. System 100 may include a first server 120, second server 140, and/or a user device 150. First server 120, second server 140, and/or user device 150 may be configured to communicate with one another through network 110. For example, communication between the elements may be facilitated by one or more application programming interfaces (APIs). APIs of system 100 may be proprietary and/or may be examples available to those of ordinary skill in the art such as Amazon® Web Services (AWS) APIs or the like. Network 110 may be the Internet and/or other public or private networks or combinations thereof.

First server 120 may be configured to perform or access via network 110 an application requiring data stored in one or more databases 124, 144 or under the control of the second server 140 and/or user device 150. For example, first server 120 may execute an application containing one or more branching operations that may be applied to FHE encrypted data stored in database 124 and/or database 144. Detailed examples of the data gathered, processing performed, and the results generated are provided below.

User device 150 may be any device configured to present user interfaces and receive inputs thereto. For example, user device 150 may be a smartphone, personal computer, tablet, laptop computer, or other device.

First server 120, second server 140, first database 124, second database 144, and user device 150 are each depicted as single devices for ease of illustration, but those of ordinary skill in the art will appreciate that first server 120, second server 140, first database 124, second database 144, and/or user device 150 may be embodied in different forms for different implementations. For example, any or each of first server 120 and second server 140 may include a plurality of servers or one or more of the first database 124 and second database 144. Alternatively, the operations performed by any or each of first server 120 and second server 140 may be performed on fewer (e.g., one or two) servers. In another example, a plurality of user devices 150 may communicate with first server 120 and/or second server 140. A single user may have multiple user devices 150, and/or there may be multiple users each having their own user device(s) 150.

Figure 2:
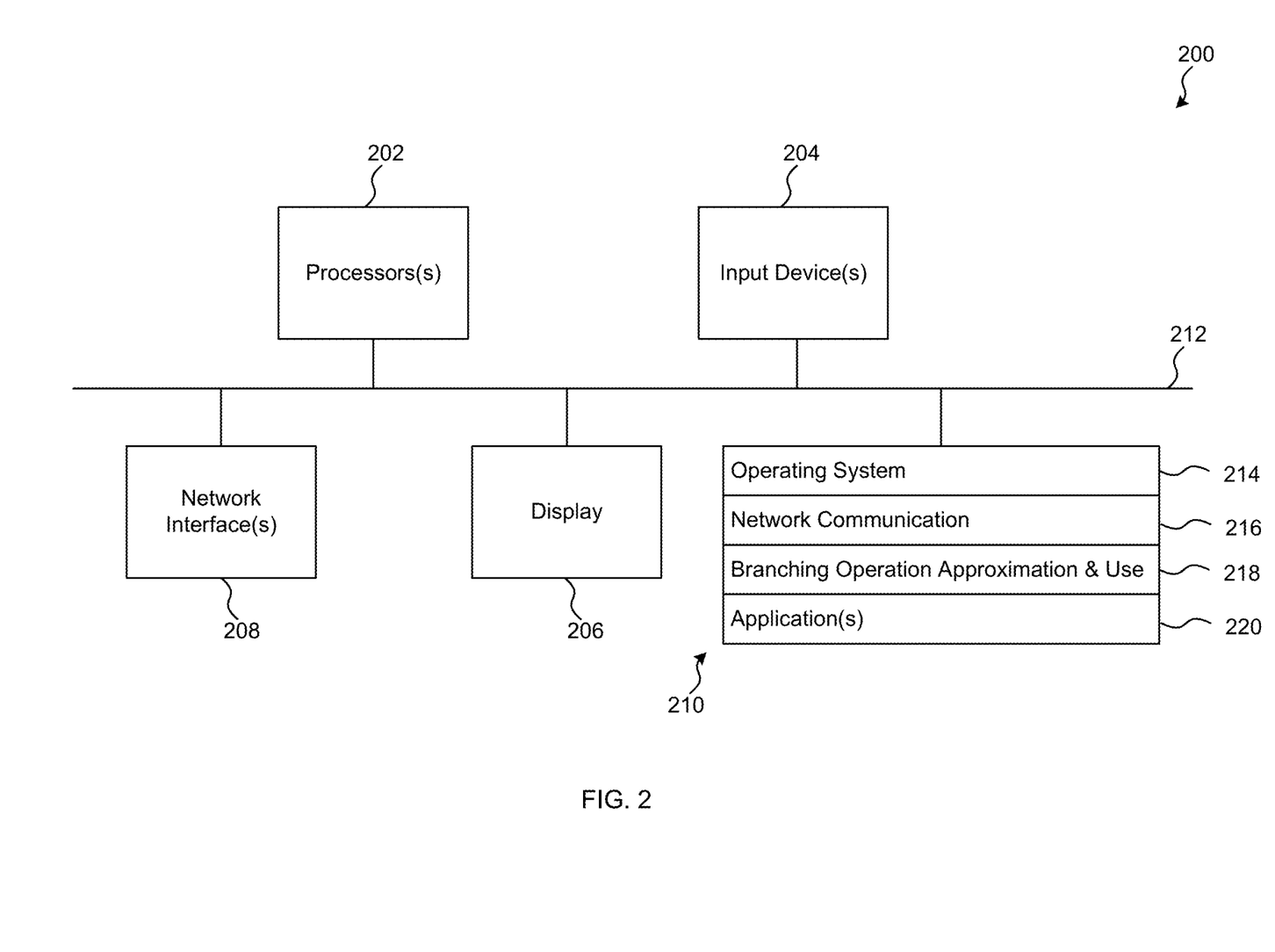
FIG. 2 shows a server device according to an embodiment of the present disclosure.

FIG. 2 is a block diagram of an example computing device 200 that may implement various features and processes as described herein. For example, computing device 200 may function as first server 120, second server 140, or a portion or combination thereof in some embodiments. The computing device 200 may be implemented on any electronic device that runs software applications derived from compiled instructions, including without limitation personal computers, servers, smart phones, media players, electronic tablets, game consoles, email devices, etc. In some implementations, the computing device 200 may include one or more processors 202, one or more input devices 204, one or more display devices 206, one or more network interfaces 208, and one or more computer-readable media 210. Each of these components may be coupled by a bus 212.

Display device 206 may be any known display technology, including but not limited to display devices using Liquid Crystal Display (LCD) or Light Emitting Diode (LED) technology. Processor(s) 202 may use any known processor technology, including but not limited to graphics processors and multi-core processors. Input device 204 may be any known input device technology, including but not limited to a keyboard (including a virtual keyboard), mouse, track ball, and touch-sensitive pad or display. Bus 212 may be any known internal or external bus technology, including but not limited to ISA, EISA, PCI, PCI Express, NuBus, USB, Serial ATA or FireWire. Computer-readable medium 210 may be any medium that participates in providing instructions to processor(s) 202 for execution, including without limitation, non-volatile storage media (e.g., optical disks, magnetic disks, flash drives, etc.), or volatile media (e.g., SDRAM, ROM, etc.).

Computer-readable medium 210 may include various instructions 214 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 204; sending output to display device 206; keeping track of files and directories on computer-readable medium 210; controlling peripheral devices (e.g., disk drives, printers, etc.) which can be controlled directly or through an I/O controller; and managing traffic on bus 212. Network communications instructions 216 may establish and maintain network connections (e.g., software for implementing communication protocols, such as TCP/IP, HTTP, Ethernet, telephony, etc.).

Branching operation approximation and use instructions 218 may include instructions that approximate branching instructions so that they can be applied to FHE encrypted data as described herein.

Application(s) 220 may be an application that uses or implements the processes described herein and/or other processes. The processes may also be implemented in operating system 214.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

Figure 3:
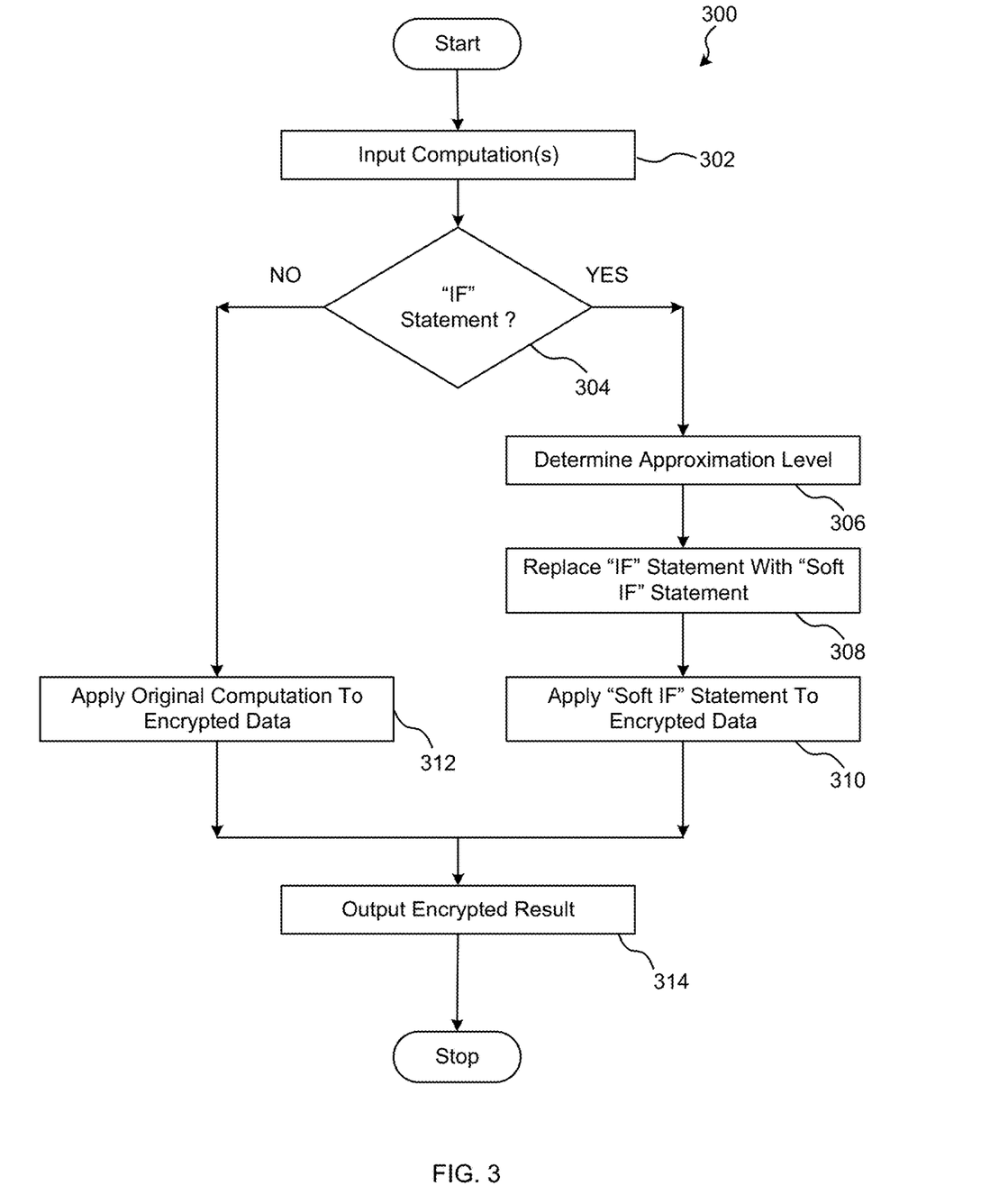
FIG. 3 shows an example branch operation approximation and use process according to an embodiment of the present disclosure.

FIG. 3 illustrates an example branch operation approximation and use process 300 in accordance with the disclosed principles. In one embodiment, system 100 may perform some or all of the processing illustrated in FIG. 3. For example, first server 120 may run via network 110 an application proprietary to second server 140 that uses FHE encrypted data located in one or more of databases 124, 144. In accordance with the disclosed principles, the application's "if" statements may be approximated and converted to "soft if" statements using polynomial approximation such that the "soft if" statements may be applied directly to the FHE encrypted data in a manner that has not previously been achievable. For example, and as discussed below in more detail, FHE encrypted data is input, processed and output during the process 300, enhancing the security of the system 100 and its data because the data is not decrypted during the process 300 or at any time during the execution of the second server's 140 proprietary application.

At step 302, the computation to be performed is input. In one embodiment, the computation may be part of a larger application program that is input all at once and steps 304 to 314 are performed on each computation within the program. In one embodiment, one or more computations may be input at step 302, the entire process 300 may be performed on the input computation(s), and then the process 300 may repeat at step 302 if more computations are required. At step 304, it is determined whether the computation is or may include a branching operation such as an "if" statement. For each computation that includes a branching operation, the process 300 may perform steps 306 to 310 before proceeding to step 314. For each computation that does not include a branching operation, the process may perform steps 312 and 314.

For example purposes only, it is presumed that the computation input at step 302 includes the following logic:

```
If (age > 50) {
    return 1;
} else {
    return 0;
}
```

In the illustrated example, the process 300 (at step 304) determines that the computation includes an "if" statement and proceeds to step 306. The input computation may be determined with respect to unencrypted data.

At step 306, the process 300 determines a suitable approximation level for the intended computation (i.e., "If (age>50)"). In one embodiment, the approximation level may be determined based on the sensitivity of the application to errors and trade-off with its execution run-time. The approximate nature may be reflected in a fuzzy area around the conditional threshold (50 in the illustrated example) for which the results of the computation will deviate substantially from the specified value (while staying in the line segment between the two options), as well as deviation for other values (which will be small). The required degree of accuracy depends on processing downstream of the results of this computation, as well as the use-case sensitivity and or error. In one embodiment, for the illustrated example, the approximation level may be the average difference (or square difference) between the original statement and the approximated version.

At step 308, the input "if" statement may be approximated and replaced with a "soft if" statement in accordance with the disclosed principles. In one embodiment, a polynomial approximation of a step function corresponding to the "If (age>50)" computation may be used. It is known that there is more than one method of replacing arbitrary (or more restrictively piece-wise continuous) functions with limited-degree polynomial approximations. In general, the different approaches begin by choosing a norm and then finding a polynomial of the desired degree that minimizes the deviation under it. Three such examples are the uniform error, integral square error, and integral absolute error methods. In one embodiment, the process 300 may utilize the mean square integral solution at step 308 due to its extendibility. That is, the problem may be illustrated as follows:

$$p^* = \min_{p \in P_n} \int_{-2}^{2} (f(x) - p(x))^2 dx \quad (1)$$

Where the approximated function f is the step function $I[x \geq 0]$ and $P_n$ is the set of polynomial functions with a degree of at most n. In the illustrated example, an interval of $[-2, 2]$ is sufficient because the selected polynomials are of the form $p(x-\theta)$ where $|\theta| \leq 1$. This gives the flexibility required to accommodate any step function in the range $[-1, 1]$, where the data is normalized into that range.

However, the inventors have determined that in most cases the sensitivity to error in the approximation is not uniform throughout the domain. The inventors determined that errors around the step are less harmful to the overall result of the algorithm compared to errors away from the split value. Accordingly, the inventors optimized the problem by solving a weighted version of equation (1) as shown below:

$$p^* = \min_{p \in P_n} \int_{-2}^{2} (f(x) - p(x))^2 w(x) dx \quad (2)$$

With the weighting function $w(x) \geq 0 \forall x \in [-2, 2]$ and $\int_{-2}^{2} w(x) dx = 1$. The inventors determined that the unique solution to this problem is obtained by the projection of f onto $P_n$ in the w-weighted norm, or alternatively by applying polynomial regression (minimizing MSE) on a discrete set of points sampled proportionally to w.

The inventors conducted experiments with polynomials solutions to equation (2) with various weight functions and degrees that demonstrated that by neglecting an interval around the step the inventors were able to obtain tighter approximations to the linear phases of the step function—providing the overall benefit of the trees constructed with them. More specifically, by using weighting functions that are zero in a window around the step and constant otherwise, a trade-off is obtained between the slope of the transition and tightness of the approximation at the edges of the interval. For larger slopes (smaller neglected windows), the approximation polynomial reaches the "0-1" plateau faster, but at the price of overshooting and oscillations around the linear parts of the step function. Although this may be remedied by choosing a very high degree polynomial, computational considerations (especially with FHE arithmetic) lead to the use of smaller functions.

Figure 4:
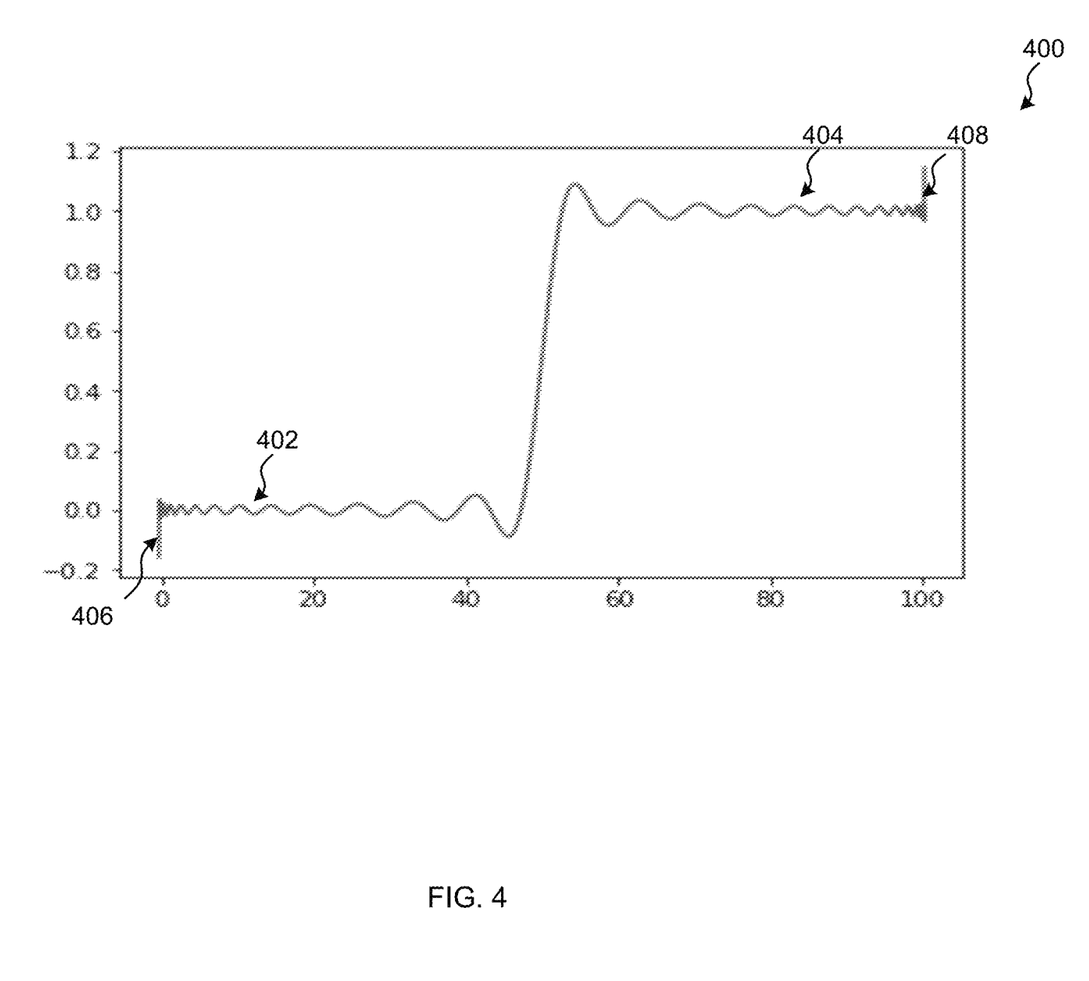
FIG. 4 shows an example step function that may be used in the branch operation approximation and use process according to an embodiment of the present disclosure.

FIG. 4 illustrates an example step function 400 that may be used in the branch operation approximation and use process 300 according to an embodiment of the present disclosure. It is known that the range of a step function is determined based on the range of potential input variables. Because the illustrated example is a determination based on age, a range for the step function 400 may be 0 to 100, covering the ages of most individuals. It should be appreciated, however, that a larger or smaller range may be used for the step function 400, particularly if the determination is based on another factor rather than age. For example, if the determination was based on a number of household members, the range of the step function 400 could be 1 to 10, covering most household sizes.

Based on the input computation, "if age>50", the corresponding step function 400 may have one portion 402 having a value of 0 in the range between 0 and 50, and one portion 404 having a value of 1 in the range between 50 and 100. This function 400 has some properties worth noting. For example, the function 400 is above ½ for any value above the cutoff value of x=50 and below ½ for values below the cutoff value of x=50. The approximation of the step function 400 is good in the desired range [0, 100]. The approximation, however, may be bad outside of the desired range [0, 100]. For example, there are spikes 406, 408 at x=0 and x=100, respectively, that may approach +\− infinity. The approximation is better in the edges than in the center, meaning that the further the input is from the cutoff value of x=50, the better the approximation is on average. In one embodiment, this property may be important to machine learning applications.

As noted above, there are other methods of finding polynomial approximations with other properties. For example, it may be possible to find the polynomial approximation that has the minimal absolute error from the step (i.e., uniform approximation), or that has better approximation properties in some parts of the range that are more important for some application-driven reason. However, as noted above, the process 300 may utilize the mean square integral solution at step 308 due to its extendibility.

At step 310, the "soft if" operation approximated in step 308 may be applied to the FHE encrypted data. In one embodiment, the data may be assumed to be previously encrypted using an FHE encryption scheme such as e.g., CKKS (Cheon-Kim-Kim-Song) with parameters that allow a sufficient number of computations and provide the appropriate level of security. In other embodiments, the data may be assumed to be previously encrypted using any known FHE encryption scheme and the disclosed principles are not limited to use with CKKS encrypted data. The computation stage may consist of the application of the encrypted version of the algorithm over this data. In the case of the example above this becomes:

$$\text{poly}(\text{age},50)*1.0+(1-\text{poly}(\text{age},50))*0.0$$

Where poly(age, 50) is the polynomial approximation of the "if age >50" operation generated in step 308.

At step 314, the result of the computation at step 310 may be output to the owner of the data (e.g., first server 120). The result of step 314 may subsequently be decrypted and rounded to the nearest integer, which in the present example is either a 0 if the age is not greater than 50 or 1 is the age is greater than 50. It should be appreciated that in the current example, process 300 may be guaranteed to return the exact result after rounding. However, when there are more "if" statements in the application program, errors may compound and there may become some (known) range of input values for which the returned result may not be desirable. This region, however, may be made small based on the parameters used in step 308 (i.e., a good approximation may be obtained by using high-enough-degree polynomials).

Referring again to step 304, if it is determined that the input computation does not include a branching operation, the process 300 continues at step 312. At step 312, the original input computation may be applied to the encrypted to generate an output that may be output to the owner (e.g., first server 120) of the data at step 314. The result of step 314 may be decrypted and process accordingly based on the input computation.

As discussed above, the process 300 illustrated in FIG. 3 may begin with the steps of inputting original computations of an application (e.g., from a second server 140) and approximating and replacing detected "if" statements by "soft if" statements before applying the "soft if" statements to the FHE encrypted data. It should be appreciated that the input computations could have already been changed to replace "if" statements with "soft if" statements, meaning that the process 300 would move directly to steps 310 or 312 without steps 304 to 308. The "if" statements may be replaced with "soft if" statements manually or automatically based as desired.

The disclosed embodiments provide several advancements in the technological art, particularly computerized and cloud-based systems in which one device (e.g., first server 120) executes another device's (e.g., second server 140) proprietary or encrypted application on proprietary or encrypted data stored across a network (e.g. cloud-based computations). Because of the disclosed principles, use of FHE encrypted data can be extended to branching operations such as e.g., "if" statements—something that could not normally be done without the disclosed principles. This creates the situation in which proprietary data never needs to be decrypted to be processed by the application, meaning that the data is secured during its input, use and output even though it may be accessed and stored by multiple devices connected to a network such as a cloud-based network. This is a major improvement in the technological art as it improves the functioning of a computer and is an improvement to the technology and technical field of encryption and security for cloud-computing and cloud-based environments.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A computer implemented method comprising:
   inputting, at a first computing device and from a second computing device connected to the first computing device through a network connection, a computation to be applied to encrypted data and to be executed on the first computing device;
   determining that the computation includes a branching statement;
   replacing the branching statement with an approximated branching statement, wherein the approximated branching statement comprises a polynomial approximation; and
   performing the computation on the encrypted data using the approximated branching statement to obtain an encrypted result of the computation.

2. The method of claim 1, wherein replacing the branching statement with the approximated branching statement comprises approximating the branching statement using the polynomial approximation.

3. The method of claim 1, wherein the polynomial approximation comprises a means square integral polynomial approximation.

4. The method of claim 1, wherein replacing the branching statement with the approximated branching statement comprises:
   determining a step function having an input range corresponding to an input range of the computation; and
   integrating the step function with the polynomial approximation, approximating the step function over the input range of the step function.

5. The method of claim 4, wherein the integrating step uses a weighting function to normalize its output.

6. The method of claim 1, wherein determining that the computation includes the branching statement comprises determining that the computation includes an "if" statement.

7. The method of claim 1, further comprising storing the encrypted result of the computation in a database connected to the first computing device via the network connection.

8. A computer implemented method comprising:
   inputting, at a first computing device, one or more computations to be applied to encrypted data received at the first computing device over a network connection;
   determining that the one or more computations comprise a branching statement;
   for each of the one or more computations comprising the branching statement:
      replacing the branching statement with an approximated branching statement, wherein the approximated branching statement comprises a polynomial approximation; and
      performing the computation on the encrypted data using the approximated branching statement to obtain an encrypted result of the computation.

9. The method of claim 8, wherein the polynomial approximation comprises a means square integral polynomial approximation.

10. The method of claim 8, wherein replacing the branching statement with the approximated branching statement comprises:
    determining a step function having an input range corresponding to an input range of the computation; and
    integrating the step function with the polynomial approximation, approximating the step function over the input range of the step function.

11. The method of claim 8, wherein determining that the computation includes the branching statement comprises determining that the computation includes an "if" statement.

12. A system for approximating a branching statement in a computation to be applied to encrypted data, said system comprising:
    a first computing device connected to a second computing device through a network connection, the first computing device configured to:
      input, from the second computing device, the computation to be applied to the encrypted data and executed on the first computing device,
      determine that the computation includes the branching statement,
      replace the branching statement with an approximated branching statement, wherein the approximated branching statement comprises a polynomial approximation, and
      perform the computation on the encrypted data using the approximated branching statement to obtain an encrypted result of the computation.

13. The system of claim 12, wherein the first computing device is configured to replace the branching statement with the approximated branching statement by approximating the branching statement using the polynomial approximation.

14. The system of claim 12, wherein the polynomial approximation comprises a means square integral polynomial approximation.

15. The system of claim 12, wherein the first computing device is configured to replace the branching statement with the approximated branching statement by:
    determining a step function having an input range corresponding to an input range of the computation; and
    integrating the step function with the polynomial approximation, approximating the step function over the input range of the step function.

16. The system of claim 15, wherein integrating the step function uses a weighting function to normalize its output.

17. The system of claim 12, wherein the first computing device is configured to determine that the computation includes the branching statement by determining that the computation includes an "if" statement.

18. The system of claim 12, wherein the first computing device is configured to store the encrypted result of the computation in a database connected to the first computing device via the network connection.

19. The system of claim 12, wherein the network connection is a cloud-based connection.

* * * * *